Jan. 26, 1937.　　　E. H. TUSTAIN　　　2,068,828
MEANS FOR CULTIVATING TURF AND SOIL
Filed Sept. 21, 1936　　　4 Sheets-Sheet 1
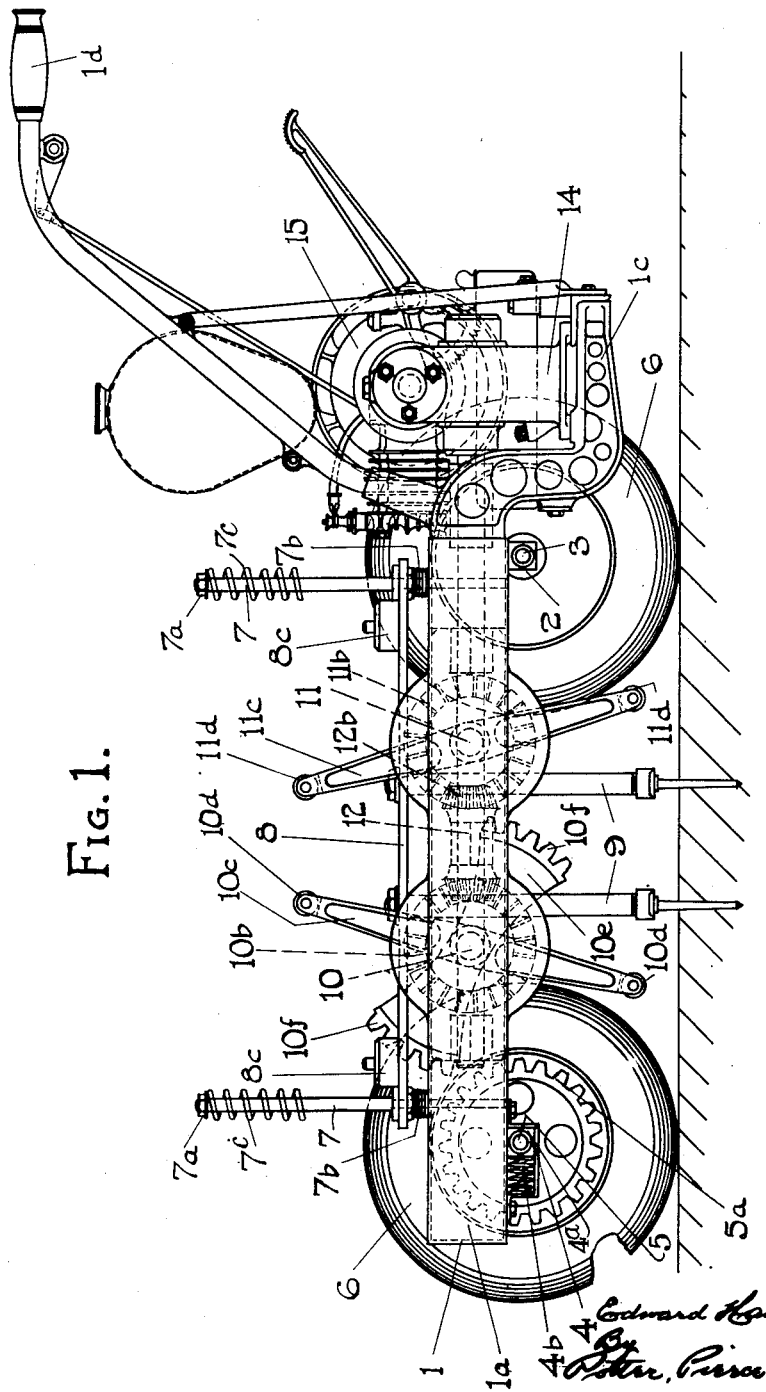

Jan. 26, 1937.  E. H. TUSTAIN  2,068,828
MEANS FOR CULTIVATING TURF AND SOIL
Filed Sept. 21, 1936  4 Sheets-Sheet 2
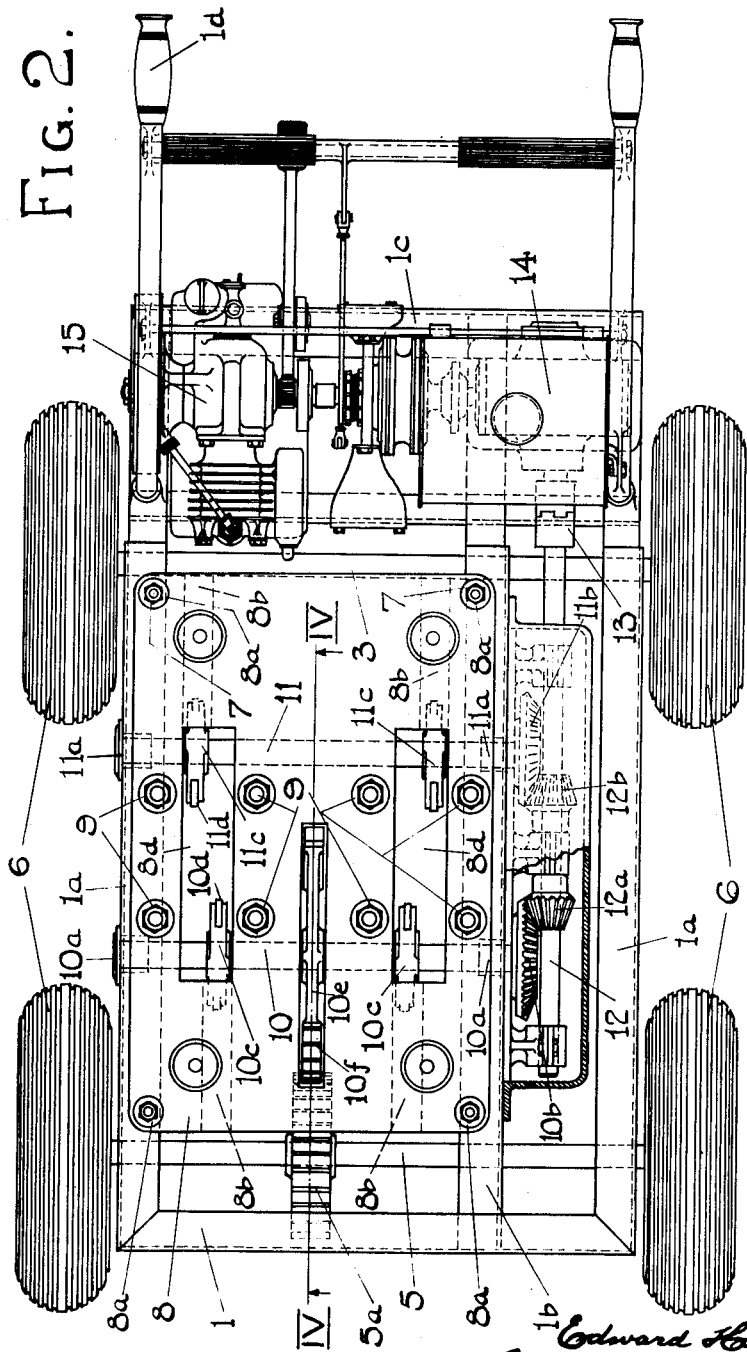

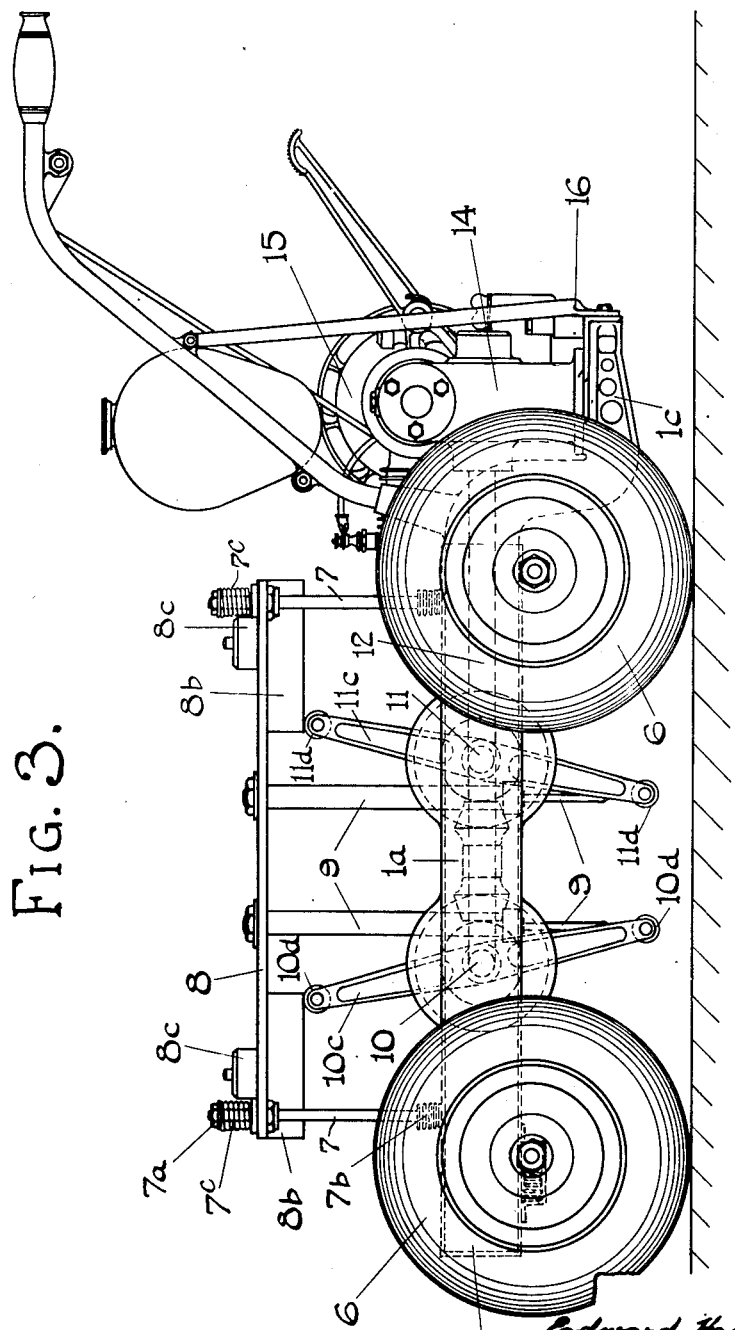

Jan. 26, 1937.　　　　E. H. TUSTAIN　　　　2,068,828
MEANS FOR CULTIVATING TURF AND SOIL
Filed Sept. 21, 1936　　　　4 Sheets-Sheet 4
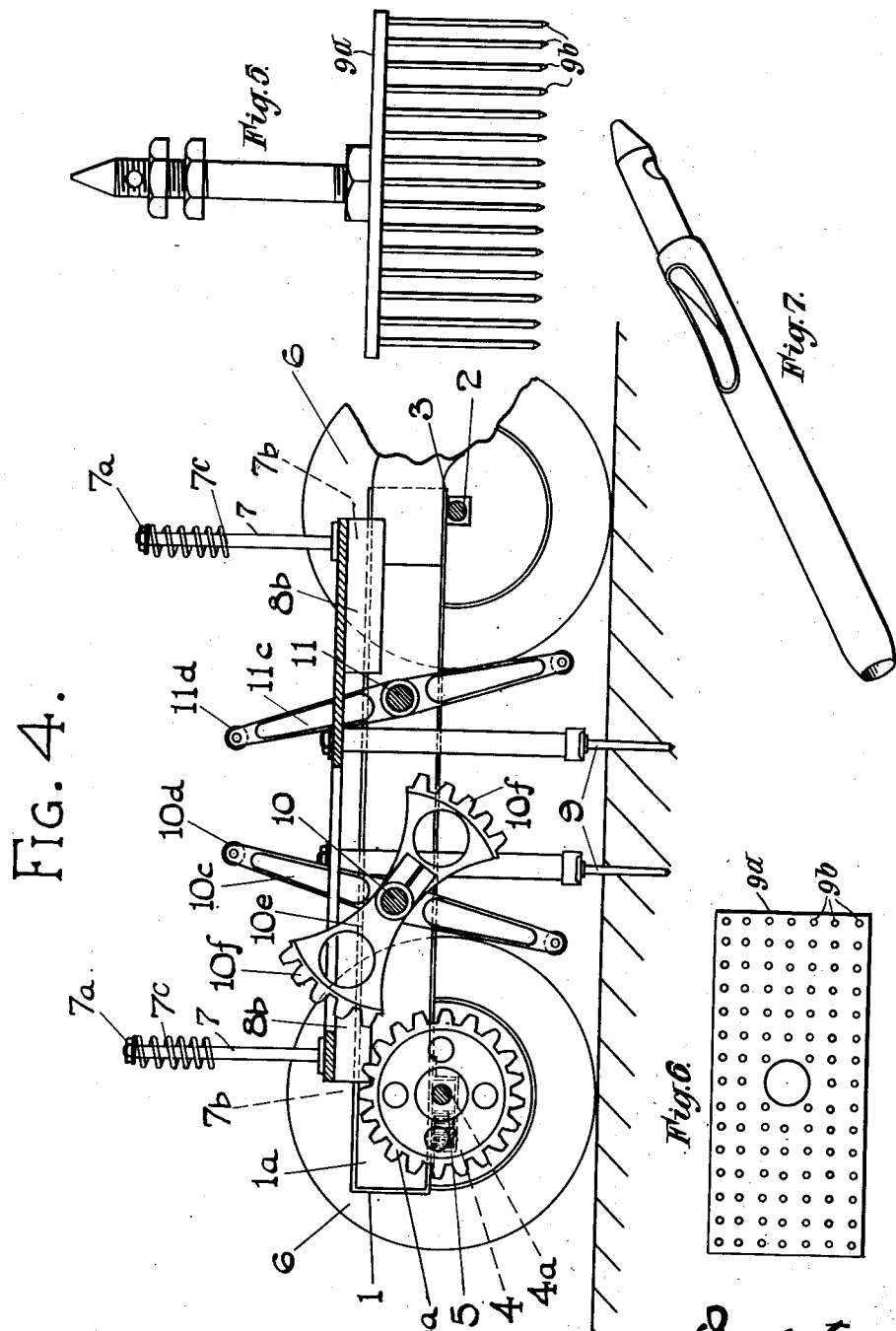

Patented Jan. 26, 1937

2,068,828

UNITED STATES PATENT OFFICE 2,068,828

MEANS FOR CULTIVATING TURF AND SOIL

Edward Hailes Tustain, London, England

Application September 21, 1936, Serial No. 101,849
In Great Britain March 23, 1936

16 Claims. (Cl. 97—44)

This invention relates to means for cultivating turf and soil, particularly golf greens, lawns and the like, wherein the turf or soil to be cultivated is perforated by means of tines which are driven into the ground at successively displaced positions so as to provide holes for aeration or other purposes at suitable spacings throughout the desired area.

Heretofore this operation has been accomplished by the use of a hand tool which requires the exertion of considerable labor to drive the tines into the ground and to withdraw the same and is therefore slow and uneconomical, particularly where large areas are to be aerated.

The present invention has for its object to provide improved simple and effective means whereby cultivation of turf or soil may be carried out more expeditiously and with the minimum of labor.

According to the present invention, a group of tines of any suitable kind is carried by a plate or member loosely located on a carrying frame so as to be capable of falling freely, and means are provided for raising the plate or member to an upper position, such means being adapted to provide for quick release of the plate or member at such upper position so that the plate or member falls and causes the tines to penetrate into the ground. Inasmuch as penetration is effected by the freely falling member, the encountering of any obstruction, such as a stone, will not cause damage to the mechanism.

The invention also embraces a turf or soil cultivating machine comprising a wheeled frame provided with means for locating a tine-carrying plate or member so as to be capable of falling freely and having mechanism for raising the plate or member to an upper position at which the plate or member is released. Means may be provided for effecting a definite forward travel of the wheeled frame after each downward stroke of the plate or member. For this purpose the mechanism for raising the plate or member may be adapted to engage and drive intermittently means connected to one of the wheel axles of the carrying frame.

The tines may be of any suitable kind and interchangeable tines of different kinds may be provided for carrying out desired cultivating operations. Thus, for simple aeration, with resulting economy in the use of water, the solid tine may be used, the perforations formed thereby serving either for letting air and/or water into the turf or soil. Alternatively, hollow tines suitable for wet or dry soil may be used with the object of taking out earth cores and leaving holes which can be filled with a compost dressing. Furthermore, a multiple needle tine may be employed, such tine consisting of a plate or the like provided with a number of closely spaced needles having a penetration, for instance, of about two inches as compared with about four inches penetration of the solid or hollow tines. The multiple needle tine has for its object the destruction of leather jackets and similar vermin.

The invention is hereinafter described by way of example with reference to the accompanying diagrammatic drawings, in which:—

Figure 1 is a side elevation illustrating one construction of machine in accordance with the invention, the near side wheels being removed for the sake of clearness, and the respective parts of the mechanism being shown in the positions occupied when the tines are in engagement with the ground;

Figure 2 is a plan view corresponding to Figure 1;

Figure 3 is a side elevation showing the parts of the mechanism in the positions occupied when the tines are withdrawn from the ground;

Figure 4 is a part longitudinal section on the line IV—IV, Figure 2 and showing the mechanism whereby the machine is propelled forwardly intermittently when the tines are withdrawn from the ground;

Figure 5 is a side elevation illustrating a multiple needle tine which can be used for the destruction of vermin;

Figure 6 is a bottom plan view corresponding to Figure 5; and

Figure 7 is a perspective view illustrating one form of hollow tine adapted to extract an earth core.

In carrying the invention into effect according to one embodiment, a frame 1 of open rectangular form and having side members 1a is provided at the underside with two fixed bearings 2 for the mounting of the rear axle 3 and with two brackets 4 in which bearings 4a for the front axle 5 are located, the axles 3, 5 being provided with wheels 6 of any suitable kind, preferably having pneumatic tires. Four vertically disposed guide bars or pillars 7 are provided, two of such guide bars or pillars 7 conveniently being fixed to one of the side members 1a and the other two being fixed to a longitudinal member 1b (Figure 2). The guide bars or pillars 7 serve for the location of a flat plate 8 which may be fitted with bosses 8a slidable upon the guide bars or pillars 7, or may be otherwise constructed so as to be capable of sliding freely upon the guide bars or pillars 7 which may be provided with heads 7a at the upper ends to prevent possibility of the disengagement of the plate therefrom and with springs 7b at their lower ends to cushion the plate 8 if it should fall beyond the normal extent of travel. The plate 8, which may be weighted by the provision of weights 8c, is provided with a number of tines 9 of any suitable form which are fixed in suitably disposed and spaced positions so as to extend downwardly. For example, the tines 9 may be arranged in two rows as shown, extending transversely across the plate 8 adjacent the middle thereof at a spacing of, for example, about six inches. In order to facilitate adjustment of the spacing of the tines, they may be mounted in slots in the plate 8.

The tines shown in Figures 1 to 4 are solid tines suitable for general use all the year round. For use particularly in the autumn, the hollow tine shown in Figure 7 may be employed, such tine extracting an earth core and leaving a hole which can be filled with a compost dressing. Furthermore, for use in the destruction of vermin, a multiple needle tine, such as shown in Figures 5 and 6, may be used, such tine having a plate 9a mounted on a shank portion and provided with closely spaced needles 9b.

Two cross shafts 10, 11 are mounted in suitable bearings 10a, 11a respectively so as to extend transversely across the frame 1 below the tine-carrying plate 8, and such cross shafts 10, 11 are driven in unison but in opposite directions, for instance, by means of bevel gearing 10b, 12a and 11b, 12b from a driving shaft 12 extending longitudinally within and adjacent one side member 1a of the frame 1. The driving shaft 12 may be coupled by means of a suitable clutch 13 to a right angle or other gearbox 14 which in turn is coupled to a small internal combustion engine 15 mounted on a platform 16 supported by downswept portions 1c of the side members 1a of the frame 1.

Each cross shaft 10, 11 is provided with two or more double arms 10c, 11c respectively which, at their extremities, are fitted with anti-friction rollers 10d, 11d, and the arms 10c, 11c on the respective cross shafts 10, 11 are set so that in travelling outwards and upwards they engage projections 8b on the underside of the tine-carrying plate 8 simultaneously and thus act to raise the plate 8 upon the guide bars or pillars 7. The plate 8 is formed with longitudinally extending slots 8d (Figure 2) at the central part, which slots are arranged so that when the arms 10c, 11c reach an approximately vertical position, they pass into the slots 8d and thus the tine-carrying plate 8 is permitted to fall freely by gravity, with the result that the tines 9 carried thereby are driven into the ground as shown in Figure 1. The arms 10c, 11c continue their rotation and eventually the opposite ends thereof engage the projections 8b so that the plate 8 is again raised in order to withdraw the tines 9 from the ground and to elevate the plate 8 to the position shown in Figure 3 from whence it is again allowed to fall when the arms 10c, 11c pass into the slots 8d.

In order that the frame 1 may be moved forward automatically at each operation so that the group of tines 9 is driven into the ground at successively displaced positions, the front cross shaft 10 may be fitted with a centrally disposed double arm 10e having at its outer ends gear sectors 10f which are adapted to engage alternately with a gear wheel 5a on the front axle 5, the arrangement being such that during the period when the tines 9 have been withdrawn clear of the ground and before the tine-carrying plate 8 is again allowed to fall, the respective sector 10f engages the gear 5a and thereby propels the machine forwards the desired distance. In order to obviate any possibility of the gear sector 10f and the gear wheel 5a jamming together, the bearings 4a in which the front axle 5 is carried are movable in brackets 4 against the action of springs 4b so that the axle is able to give to a suitable extent if required to enable the sector 10f to move into mesh with the gear wheel 5a. A hand wheel may be provided on one of the cross shafts for the purpose of setting the mechanism in the position shown in Figure 3, while the machine is moving from place to place. Suitable handles 1d extend from the rear of the machine for steering and, if desired, for propelling the same.

In order that adequate penetration may be obtained without unduly increasing the weight of the tine-carrying plate 8, compression springs 7c may be provided, for instance, on the pillars 7 above the plate 8, such springs 7c being compressed during the upward movement of the plate 8, or during the latter part of such upward movement so that when the arms 10c, 11c pass into the slots 8d and release the plate 8, the latter is given a substantial downward impulse by the compressed springs 7c. The springs 7c may be adjustable or interchangeable with other springs so that the desired degree of penetration under any particular conditions may be secured, if desired, without the use of weights 8c or the like.

It will be understood that the invention is not limited to the particular construction hereinbefore described. For example, the self-propelling mechanism herein described may be omitted, if desired, in which case the operator would move the machine by hand between each penetration.

I declare that what I claim is:—

1. Means for cultivating turf and soil comprising a carrying frame supported from the ground, a member such as a plate loosely located with respect to such frame so as to be capable of falling freely from an upper position, tines mounted on the said member to extend downwardly therefrom, mechanism operable to raise the said member to such upper position, and means for releasing the said member from the said upper position so that the said member in falling causes the said tines to penetrate into the ground.

2. Means for cultivating turf and soil comprising a carrying frame supported from the ground, a floating member such as a plate located with respect to the said frame, tines mounted to extend downwardly from the said member, and mechanism acting to raise the said member to an upper position and to release the said member at such upper position.

3. Means for cultivating turf and soil comprising a wheeled carrying frame, a member such as a plate loosely located with respect to such frame so as to be capable of falling freely from an upper position, tines mounted to extend downwardly from the said member, mechanism operable to raise the said member to such upper position, means for releasing the said member at the upper position, and means coupled to said mechanism for effecting a definite forward travel of the wheeled frame while the said member is raised with the said tines clear of the ground.

4. Means for cultivating turf and soil as claimed in claim 3, wherein the said mechanism for raising the said member includes means engaging and driving intermittently one of the wheel axles of the said wheeled carrying frame.

5. Means for cultivating turf and soil comprising a wheeled carrying frame, a tine-carrying member such as a plate loosely located with respect to such frame so as to be capable of falling freely from an upper position, cross shafts mounted in the said frame, gearing driving the cross shafts in opposite directions and in unison, arms fixedly mounted on said cross shafts and arranged to engage the underside of the said tine-carrying member simultaneously so that the said member is raised thereby, the said member having slots arranged to receive said arms when the said member has been raised to the said upper position.

6. Means for cultivating turf and soil as claimed in claim 5, wherein the said arms are provided at their ends with anti-friction rollers and the arms on one cross shaft are staggered in relation to the arms on the other cross shaft, for the purpose described.

7. Means for cultivating turf and soil as claimed in claim 5, including also a double-armed member fixedly mounted upon one of the said cross shafts, said double-armed member having toothed sectors at its ends, and a gear wheel fixedly mounted on one of the axles of the wheeled carrying frame said gear wheel being alternately engaged by the said toothed sectors so that the carrying frame is propelled forwardly a definite distance while the tine-carrying member is raised.

8. Means for cultivating turf and soil as claimed in claim 5, including also a double-armed member fixedly mounted upon one of the said cross shafts, said double-armed member having toothed sectors at its ends, a gear wheel fixedly mounted on one of the axles of the wheeled carrying frame, said gear wheel being alternately engaged by the said toothed sectors so that the carrying frame is propelled forwardly a definite distance while the tine-carrying member is raised, and resiliently mounted bearings carrying the said wheel axle.

9. Means for cultivating turf and soil comprising a wheeled carrying frame, vertically disposed pillars on the said frame, a tine-carrying member such as a plate slidably located by the said pillars, and mechanism operable to raise the said member to an upper position and to release the said member at such upper position so that it falls freely.

10. Means for cultivating turf and soil as claimed in claim 9, including compression springs associated with the said pillars and disposed above the said tine-carrying member, for the purpose described.

11. Means for cultivating turf and soil comprising a wheeled carrying frame, a member such as a plate loosely located with respect to such frame so as to be capable of falling freely from an upper position, tines mounted to extend downwardly from the said member, mechanism operable to raise the said member to such upper position, means for releasing the said member at the upper position, means coupled to said mechanism for effecting a definite forward travel of the wheeled frame while the said member is raised with the said tines clear of the ground, a power unit mounted on the said carrying frame, and gearing and clutch means connecting said power unit to the said mechanism.

12. Means for cultivating turf and soil comprising a wheeled carrying frame, vertically disposed pillars on the said frame, a tine-carrying member such as a plate slidably located by the said pillars, cross shafts mounted in the said frame, gearing driving the cross shafts in opposite directions and in unison, arms fixedly mounted on said cross shafts and arranged to engage the underside of the said tine-carrying member simultaneously so that the said member is raised thereby to an upper position, the said member having slots arranged to receive said arms when the said member has been raised to the said upper position.

13. Means for cultivating turf and soil as claimed in claim 12, wherein the arms on one cross shaft are staggered in relation to the arms on the other cross shaft and wherein each pair of opposed and staggered arms passes into a common slot in the said tine-carrying member when said member is raised by the said arms to the said upper position.

14. Means for cultivating turf and soil as claimed in claim 1, wherein the tines are hollow tines capable of extracting a core of earth at each operation.

15. Means for cultivating turf and soil as claimed in claim 1, wherein each of the said tines includes a number of closely spaced needles for the purpose of destroying vermin in the turf or soil.

16. Means for cultivating turf and soil comprising a rectangular carrying frame, two pairs of wheels mounted on axles supporting the said frame, at least one of the said axles being a live axle, four vertically disposed pillars mounted on the said frame, a plate slidably located by the said pillars, tine-mounting members extending downwardly from the said plate, two cross shafts symmetrically disposed with respect to the said plate, gearing arranged to drive the said cross shafts in opposite directions and in unison, double arms fixed on the said cross shafts and provided at their ends with anti-friction rollers, the arms being arranged so that the rollers thereon engage the underside of the said plate simultaneously so as to raise the same upon the pillars, the said plate having slots into which the arms pass when reaching an approximately vertical position so as to release the said plate, a double-armed member provided with toothed sectors fixedly mounted on one of the said cross shafts, a gear wheel fixedly mounted on the adjacent live axle for engagement alternately by said toothed sectors, resiliently mounted bearings for the said live axle, such bearings permitting movement of the said live axle in a direction away from the cross shaft carrying the member provided with toothed sectors, a power unit carried by the said frame, and means connecting the said power unit to the said gearing.

EDWARD HAILES TUSTAIN.